A. SUNDH.
AUTOMATIC BLOCKING MECHANISM FOR STRIP MILLS.
APPLICATION FILED AUG. 28, 1916.

1,261,180.

Patented Apr. 2, 1918.
3 SHEETS—SHEET 3.

Inventor
August Sundh
By his Attorney
James G. Bethell.

UNITED STATES PATENT OFFICE.

AUGUST SUNDH, OF HASTINGS-UPON-HUDSON, NEW YORK.

AUTOMATIC BLOCKING MECHANISM FOR STRIP-MILLS.

1,261,180.   Specification of Letters Patent.   Patented Apr. 2, 1918.

Application filed August 28, 1916. Serial No. 117,131.

*To all whom it may concern:*

Be it known that I, AUGUST SUNDH, a citizen of the United States, residing in Hastings - upon - Hudson, in the county of Westchester and State of New York, have invented a new and useful Improvement in Automatic Blocking Mechanism for Strip-Mills, of which the following is a specification.

My invention relates to an improvement in automatic blocking mechanism for strip mills, wherein the strips after being fed to the strip mill pass through guiding mechanism to the block, and are automatically attached to the block and wound or blocked thereon.

Briefly I have provided a block, comprising a cylindrical shell. Within the block is expandible and collapsible mechanism. This mechanism is adapted to be magnetized to attract the block which is made in sections and acts as an armature for the mechanism within the block, the strip being clamped between the block and the inner expandible and collapsible mechanism. I have provided an alternating current motor for driving the block, and a direct current generator driven by this motor, this generator supplying current for various direct current magnets, the latter operating automatically to withdraw guiding mechanism for the strips, to release holding means for the block, and expand the mechanism within the block. A strip mill is driven by an alternating current motor receiving its current from the same source of supply as the motor which drives the block. In the circuit of the motor driving the mill I have provided an electroresponsive device, the latter controlling an electroresponsive device which is turn controls the flow of current from the generator to the various electromagnets and closes a circuit from the generator to the windings of the mechanism within the block. There are three switches only for controlling the entire apparatus, two of these being left closed all the time, and the other being operated manually each time a strip is blocked. Aside from these switches the operation of the whole mechanism is automatic. As it is preferable to operate the various parts of the machine with direct current and as I have provided means for generating direct current for this purpose, it is not necessary to lead direct current into the building where the machine is to be installed, as is the case with automatic blocking mechanism now in use. The advantage of this is apparent in considering the case of several machines of this nature, with each machine generating the current for operating it, in case the current should be interrupted in one machine, the other machines will not be affected. In other words so far as the operating mechanism is concerned each machine is complete in itself. With my arrangement it is not necessary to use any grounded circuits, nor is it necessary to have a circuit passing through the strips, nor necessary to use current of low voltage.

In the drawings accompanying this description.

Referring to the drawings in detail I will first of all describe the block and the operation thereof: It comprises a cylindrical shell 1, made up of four sections, hinged to each other at 2, a space 3 being left between the abutting edges of two of the sections to leave an opening or slot the entire length of the block for the purpose of admitting the strip to the inside thereof. One of these sections which I will designate 4 is threaded into a ring 5 having formed thereon a hand wheel 6, the latter being provided as a ready means of rotating the block until the space or slot 3 shall be in position to receive the strip. The ring 5 is mounted for rotation on a member 7 bolted to a ring 8, the members 7 and 8 rotating with a hollow shaft 9 mounted in bearings 10 and 11 and rotated by means of an alternating current motor 12 to which it is connected by a belt 13. With the block in position so that the slot 3 may receive the strip, the sections of the block hinged to the section 4 will fall outwardly to cause the block to assume practically a cylindrical shape. The hand wheel 6 and consequently the block is held against rotation by means of a member 14, the end of which projects into a recess formed in the hub of the hand wheel 6, it being understood, of course, that this recess is so positioned that when the member 14 has entered it, the slot 3 will be in position to receive the end of the strip as it comes from the strip mill. A rod 15 is carried within the hollow shaft 9, the outer end, the left hand end as viewed in Fig. 2, being screwed into a short shaft 16 connected by toggles 17 to one end of the expandible sections 18, of which I show four, within the block, the other end of these sections being pivoted at 19 and adapted to be swung about these pivots outwardly and inwardly toward and away from the sections 1 of the block. It will be seen from my description thus far that longitudinal movement of the rod 15 will cause the inside sections 18 to either expand or collapse depending upon which way the rod is moved. To clamp the strips, I have provided windings 20 for each of the sections 18, the energization of which will attract the sections of the block and therefore clamp the strip between the mechanism within the block and the block itself, the different sections 1 of the block acting as armatures for the windings of the various sections of the mechanism within the block. It will be understood that while the mechanism within the block is provided to be collapsed and expanded, it also assists in holding the strips attached to the block, although the magnetizable mechanism is sufficient in itself to hold the strips attached. The windings receive their current through collector rings 21 and 22, to which they are connected in parallel, and which are carried on the shaft 9. Direct current is supplied to these windings from a direct current generator 23, this generator being rotated by alternating current motor 12 to the armature shaft of which the generator is connected. To move the rod 15 to the left as viewed in Fig. 1 and thus expand the sections 18, I provide a lever 24, fulcrumed at 25 and having a slot and pin connection 26 with a sleeve 70 mounted for rotation on a hub 71 carried on the end of the rod 15, ball bearings 72 being provided for the sleeve 70 to ride on, this lever being connected to a movable core 27 of a direct current fixed magnet 28, the winding of which magnet is energized by current developed by the generator 23 before mentioned. The rod 14 which I have already pointed out forms a means for holding the block in fixed position, is adapted to be retracted or drawn out of the recess in the block by means of a direct current magnet 29, to the core 30 of which it is connected by means of a lever 31 fulcrumed at 32, the rod 14 being connected to the lever 31. The winding of the magnet 29 is energized also by current developed by the generator 23. A hook is formed on one end of the lever 31, which engages a similar hook 33 secured to the guiding mechanism of the block when the guiding mechanism is in guiding position. When the magnet 29 is energized, however, and pulls in its core 30, the hook on the lever 31 will be pulled out of engagement with the hook 33 and the guides, of which there are two, an upper and a lower, will be swung about a pivot 34 under the action of a coil spring 35, one end of which is secured to the guiding mechanism and the other end to some fixed point, such as some part of the rolling mill. Plates 35' are provided in fixed position with their ends adjacent the rolls of the rolling mill R for the purpose of scraping the strips from the rolls as they come through the rolling mill and to guide the strip until it reaches the guiding mechanism proper.

Figure 1:
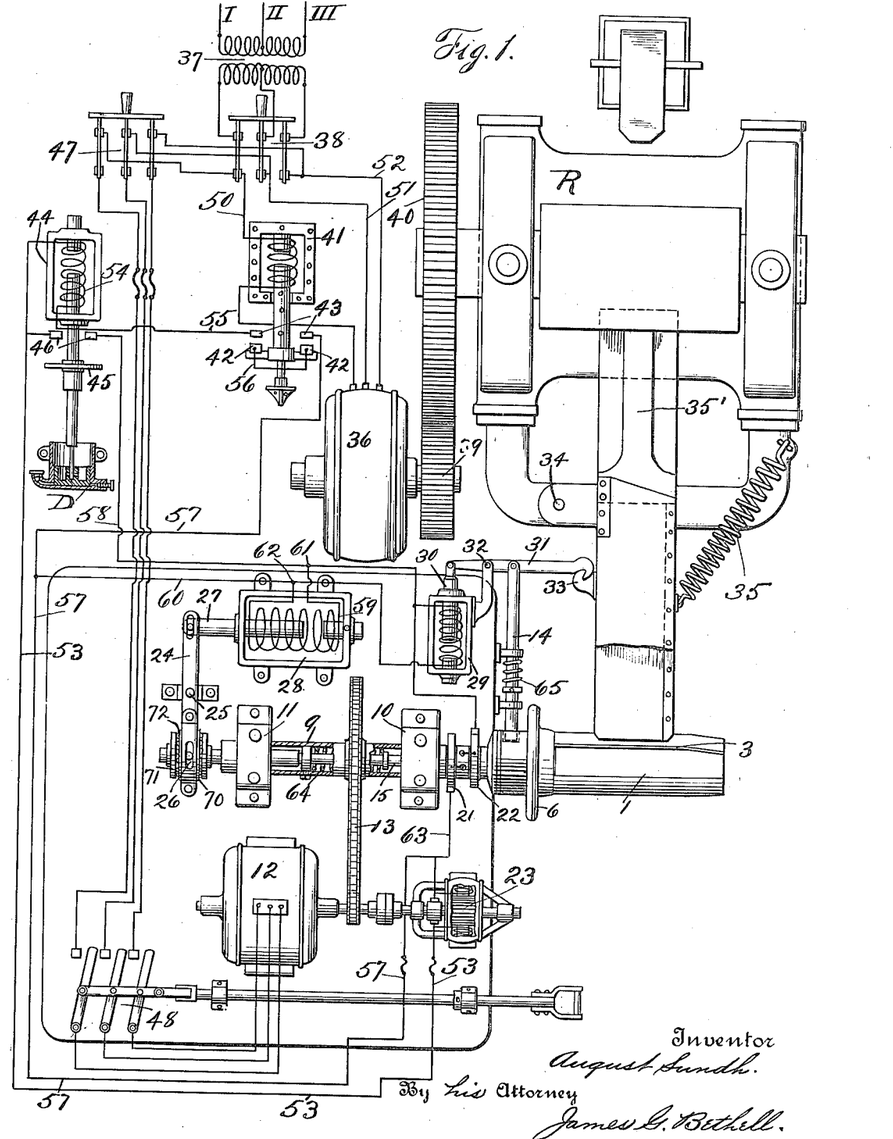
Figure 1 is a plan view of the whole apparatus, showing the rolling mill and block, the various magnets controlling the operation of the apparatus and the circuits for the magnets.
Figures 2, 4, 5:
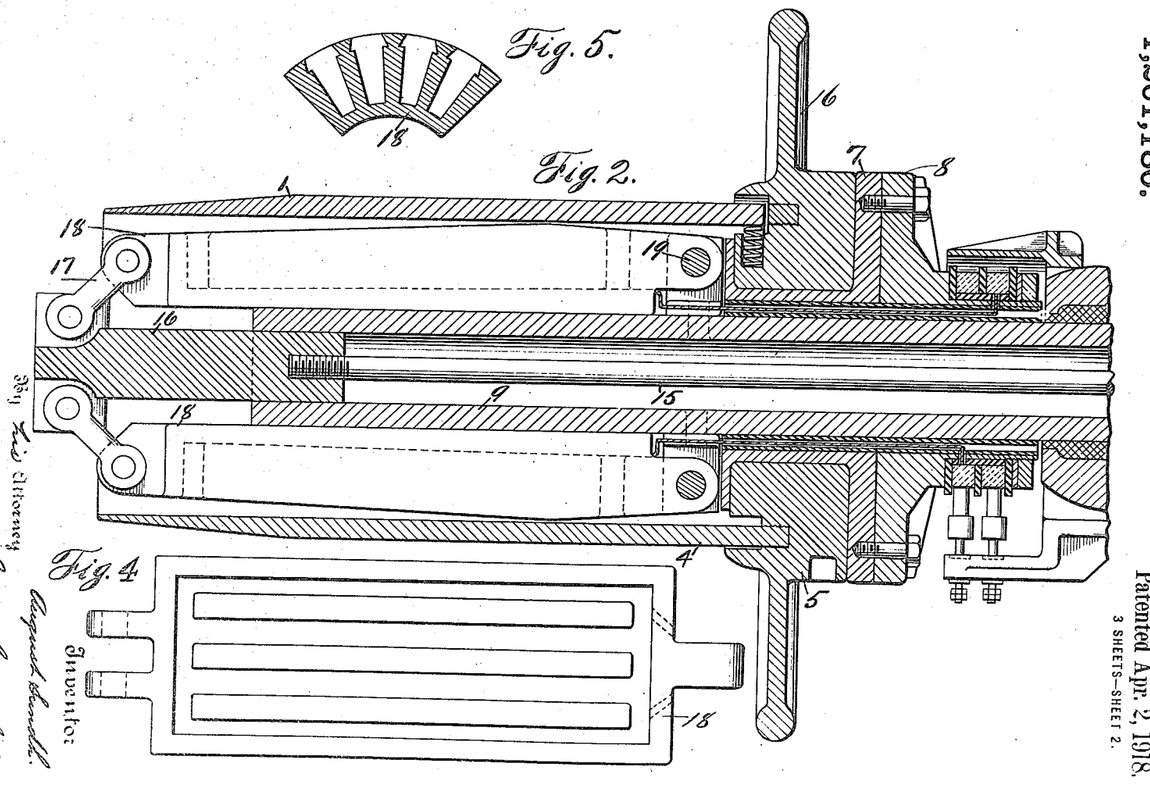
Fig. 2 is a sectional elevation of the block and the mechanism within the block.
Fig. 4 shows in elevation one of the sections making up the expandible mechanism within the block.
Fig. 5 is a section through the member shown in Fig. 4.
Figure 3:
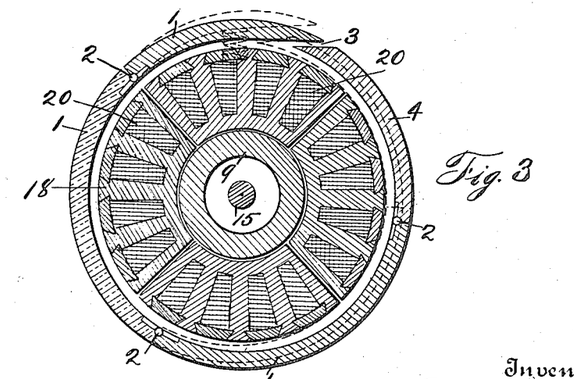
Fig. 3 is a section through the block and the mechanism within the block.

To drive the rolling mill I have provided an alternating current motor 36, receiving its current from a source of alternating current supply 37, the current being controlled by a manually operable switch 38. This motor 36 is shown geared to the rolling mill through gears 39 and 40. In the lead designated I of the motor circuit, I have shown an alternating current electroresponsive device 41 of laminated material, this device being adapted to be operated by the increased flow of current through the motor 36 as the load on the latter is increased by reason of the strips being fed to the rolling mill. The lower end of the core of this magnet 41 carries contacts 42 which when the magnet is energized and the core raised will engage a pair of stationary contacts 43, which control the winding of a direct current magnet 44, this magnet receiving its current from the generator 23. The core of this magnet carries a plate 45 which when the magnet is energized will bridge a pair of stationary contacts 46 which control the flow of current from the generator 23 through the magnets 28 and 29 already referred to and the windings 20 of the sections 18 inside the block. To regulate the closing of the circuits of these magnets and the windings last mentioned, properly, relative to the energization of the winding of the magnet 41, I have provided adjustable dashpot mechanism D on the lower end of the core of the magnet 44, so that this core will be raised at the proper instant; for it will be understood that all the parts must be so timed that the strip will be attached to the block at the instant it enters it. A switch 47 is provided in the supply line for the motor 12, this switch being kept closed. The motor is started and stopped through a switch 48 adapted to be operated manually by the operator of the apparatus.

Figure 6:
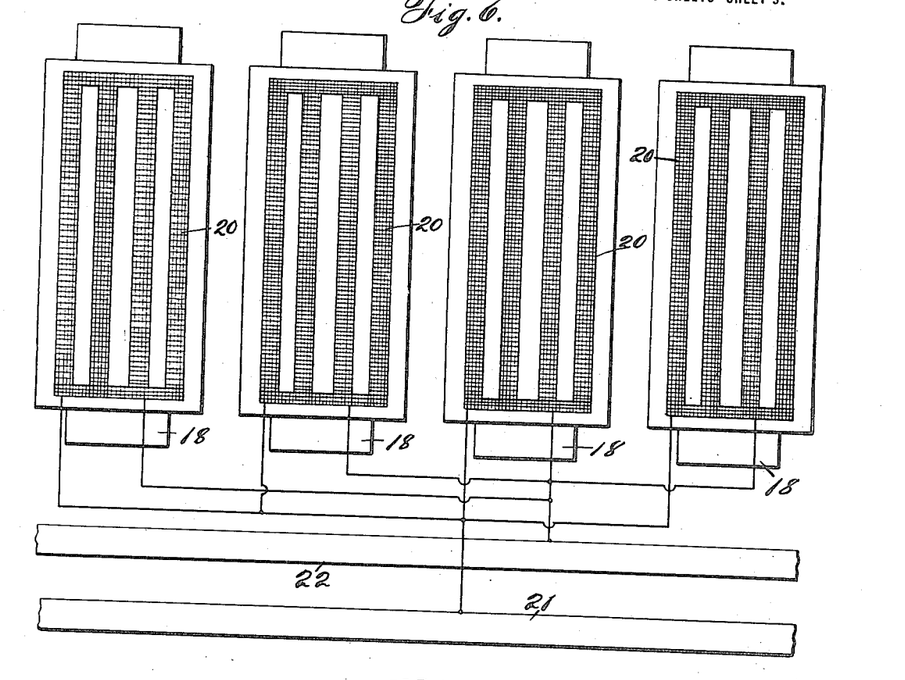
Fig. 6 shows diagrammatically the winding of the various sections such as the one shown in Fig. 4, and the way they are electrically connected to each other and to collector rings.

Having now described the construction of my device I will proceed to describe its operation: With the switch 38 closed, the alternating current motor 36 receives current from the main I through the switch, conductor 50, winding of the magnet 41, through the motor and by way of conductor 51 and switch 38 out II. It also receives current from the main III through the switch, conductor 52, through the motor, and by way of conductor 51 and switch 38 out II. At this time the motor 36 is running light, that is to say merely driving the rolling mill. As soon as a strip is fed to the rolling mill, a heavier load will be thrown on the motor and the increased flow of current through the motor will now be sufficiently strong to cause the magnet 41 to raise. its core, moving movable contacts 42 into engagement with the fixed contacts 43. Prior to the strip being fed to the rolling mill the operator closes the switch 48 controlling the alternating current motor 12 which drives the mechanism within the block and the latter will rotate, as well as the generator 23. Closure of the contacts 42, 43, will close a circuit from the generator 23, by way of conductor 53, winding 54 of the direct current magnate or relay 44, conductor 55, left hand contacts 43 and 42, lead 56, right hand contacts 42, 43, conductor 57, and back to the other side of the generator. The magnet 44 by reason of its winding being energized will raise its core against the action of the dashpot D to cause the bridge 45 to bridge fixed contacts 46. The dashpot mechanism D being adjustable it is set so that by the time the magnet 44 has raised its core sufficiently to bridge the contacts 46, the strip will have traveled through the guides and reached the slot 3 of the block and entered to the inside thereof. At this instant the strip should be attached to the block. It will be found that bridging of the contacts 46 will close a circuit not only to the windings 20 inside the block, but also to the windings of the magnets 28 and 29. The circuit for the winding of the magnet 28 may be traced, from the generator 23, conductor 53, through the contacts 46 by way of the bridge 45, conductor 58, winding 59 of the magnet 28, conductors 60 and 57, back to the other side of the generator. The winding of the magnet 29 is connected in parallel to the circuit just traced for the winding of the magnet 28, one side of the magnet being tapped off the conductor 58 at 61, and the other side being tapped off the conductor 60 at 62. Windings 20 of the inside of the block receive their current from the generator 23 by way of conductor 53, through the contacts 46, by way of the bridge 45, conductor 58, collector ring 22, through the windings 20, of the sections 18 inside the block, these sections being connected up in parallel as shown in Fig. 6, collector ring 21 and conductor 63 to the other side of the generator.

Energization of the winding of the magnet 28 actuates the core 27 and by reason of the connection of this core with the shaft 15, the latter will be drawn to the left as viewed in Fig. 1 to actuate the toggles 17 to cause the sections 18 to be expanded. As the magnet winding of the magnet 29 receives current at the same time by way of the circuit already traced, this magnet will actuate its core and release the member 14 from in engagement with the recess in the block, leaving the block free to rotate with the strip attached thereto, and the lever 31 will also have been actuated to pull it out of engagement with the hook 33 formed on the guiding mechanism and the guiding mechanism will be swung out of guiding position about the pivot 34 under the action of the spring 35. The windings 20 receiving current through the circuit already traced will attract the block to pull the same inwardly to clamp the strip between the block and the mechanism within the block, the latter now being expanded.

The block may now rotate until the strip passes through the rolling mill, at which time, due to the load being taken off the motor 36, the magnet 41 will drop its core, which opens the circuit to the windings of the direct current magnet or relay 44, and the latter will drop its core, and the circuits for the magnets 28 and 29 will be open as well as the circuit of the windings 20 of the interior of the block. The rod 15 will now be moved to the right under the action of a coil spring 64 which surrounds it, to cause the collapse of the sections 18, and the rod 14 will be forced downwardly under the action of a coil spring 65 which it carries to bring the rod 14 into position to engage the depression in the hub of the hand wheel 6, as well as to pull the lever 31 downwardly where it will be in position to engage the hook 33 when the guiding mechanism is swung around again to guiding position. The operator opens the switch 48 and the block comes to rest, with the mechanism within the block, collapsed, ready for the removal of the blocked strip.

As the arrangement of the various parts of my apparatus might be changed by one skilled in the art, without departing from the spirit and scope of the invention, I desire not to be limited thereto.

What I claim as new and desire to secure by Letters Patent of the United States is:

1. In mechanism adapted to wind a strip coming from a strip mill, the combination of an alternating current motor for driving said mechanism, a direct current generator driven by said motor for supplying current for controlling said mechanism, and means operable automatically by alternating current for controlling the current derived from the direct current generator.

2. In mechanism adapted to wind a strip coming from a strip mill, the combination of a motor generator set for operating said mechanism and for winding the strip, a timing device operated by direct current from said generator to control the operation of said mechanism, and means operable by alternating current for controlling the operation of said timing device.

3. In mechanism adapted to wind a strip coming from a strip mill, the combination of a motor generator set for operating said mechanism and for winding the strip, and a timing switch adapted to be operated by direct current from said generator to control the operation of said mechanism.

4. The combination of a strip mill, a motor for driving said strip mill, mechanism adapted to wind a strip coming from the strip mill, and a device dependent for operation upon the load on the motor for controlling the strip winding mechanism.

5. The combination of a strip mill, a motor for driving said strip mill, mechanism adapted to wind a strip coming from the strip mill, and an electroresponsive device dependent for operation upon the load on the motor for controlling the strip winding mechanism.

6. The combination of a strip mill, an alternating current motor for driving said strip mill, mechanism adapted to wind a strip coming from the strip mill, a direct current electroresponsive device for controlling said mechanism, and an alternating current electroresponsive device controlled by the motor which drives the strip mill for controlling said direct current electroresponsive device.

7. The combination of a strip mill, an alternating current motor for driving said strip mill, mechanism adapted to wind a strip coming from the strip mill, a direct current electroresponsive device for controlling said mechanism, and an alternating current electroresponsive device dependent for operation upon the load on the motor for controlling said direct current electroresponsive device.

8. The combination of a strip mill, an alternating current motor for driving said strip mill, mechanism adapted to wind a strip coming from the strip mill, an adjustable direct current electroresponsive device for controlling said mechanism, and an alternating current electroresponsive device dependent for operation upon the load on the motor for controlling said direct current electroresponsive device.

9. The combination of a strip mill, an alternating current motor for driving said strip mill, mechanism adapted to wind a strip coming from the strip mill, means for attaching the strip to said mechanism, a direct current electroresponsive device for controlling the winding mechanism and the means for attaching the strip to said mechanism, and an electroresponsive device dependent upon the load on the motor for controlling said direct current electroresponsive device.

10. In mechanism adapted to block a strip coming from a strip mill, the combination of a rotary block, a generator, a motor for driving both the block and the generator, electrical means for operating the block, a circuit for said means from the generator, an electric motor for driving the strip mill, and means controlled thereby for closing the circuit from the generator to the means for operating the strip mill.

11. In mechanism adapted to block a strip coming from a strip mill, the combination of a rotary block, a direct current generator, an alternating current motor for driving both the block and generator, direct current electrical means for operating the block, a circuit for said means from the generator, an alternating current motor for driving the strip mill, and means controlled thereby dependent for operation upon the load on the strip mill motor for closing the circuit from the generator to the means for operating the block.

12. In mechanism adapted to block a strip coming from a strip mill, the combination of a rotary block, a generator, a motor for driving both the block and generator, electrical means, dependent upon the generator for current supply, to operate the block, an alternating current motor for driving the strip mill, and means in the circuit of said motor and dependent for operation upon the load on the strip mill motor for controlling the said electrical means.

13. In mechanism adapted to block a strip coming from a strip mill, the combination or a rotary block, a generator, a motor for driving both the block and generator, electrical means for operating the block, said means operating by current supplied by the generator, a relay controlling said electrical means, an alternating current motor for driving the strip mill, and an electrical device dependent for operation upon the load upon said motor for controlling said relay.

14. In mechanism adapted to wind a strip coming from a strip mill, the combination of a rotary block, electrical windings within said block, an outer shell for said block adapted to function as an armature for the inside of said block, to attach the strip to the block, a generator for supplying current to said windings, and a motor for driving both the block and the generator.

15. In mechanism adapted to wind a strip coming from a strip mill, the combination of a rotary block, comprising inner magnetizable mechanism and an outer casing adapted to be attracted to said inner mechanism to clamp the strip, a generator for supplying current to said magnetizable mechanism, a motor for driving both the block and generator, a motor for driving the strip mill, and electrical means dependent upon the load on the strip mill motor for controlling the flow of current from said generator to said magnetizable mechanism.

16. In mechanism adapted to wind a strip coming from a strip mill, the combination of a rotary block, comprising inner magnetizable mechanism and an outer casing adapted to be attracted to said inner mechanism to clamp the strip between the two, a generator for supplying current to said magnetizable mechanism, a motor for driving both the block and generator, an adjustable relay for controlling the flow of current from the generator to said magnetizable mechanism, and an electrical means dependent upon the load on the strip mill motor for controlling said relay.

17. In mechanism adapted to wind a strip coming from a strip mill, the combination of a rotary block comprising inner expandible and magnetizable mechanism and an outer casing adapted to be attracted to said inner mechanism, means to expand the inner mechanism, means coöperating therewith to magnetize the inner mechanism, the expanding and magnetizing of the block causing the strip to be attached to the block, a generator supplying current for the magnetization of said block, a motor for driving the block and generator, and an electrical device controlling both the expanding and magnetizing of the block.

18. In mechanism adapted to wind a strip coming from a strip mill, the combination of a rotary block, a direct current generator, an alternating current motor for driving both the block and generator, an alternating current motor for driving the strip mill, direct current magnets for operating the block, deriving their power from the said direct current generator, and an alternating current magnet controlled by the motor for driving the strip mill for controlling said direct current magnets.

19. In mechanism adapted to wind a strip coming from a strip mill, the combination of a block, comprising inner rotatable expandible and magnetizable mechanism and an outer rotatable casing separate therefrom, a direct current magnet for expanding the inner mechanism, means for holding the outer casing stationary, a direct current magnet for releasing said holding means, a direct current magnet for controlling said magnets, and the magnetization of the inner mechanism of the block, a generator for supplying current for said magnets and for the magnetization of the inner mechanism of the block, to cause the strip to be attached to the block and to permit the block to rotate as a unit, and an alternating current motor for rotating the block and generator.

20. In mechanism adapted to wind a strip coming from a strip mill, the combination of a block comprising inner rotatable expandible and magnetizable mechanism and an outer rotatable casing separate therefrom, means for holding the outer casing stationary, direct current magnets for expanding the inner mechanism of the block, magnetizing it and releasing the holding means for the outer casing, a direct current magnet controlling said magnets, a direct current generator supplying current for said magnets, a motor for driving the block and generator, an alternating current motor for driving the strip mill, and an electrical device in the circuit of said motor for controlling the last named direct current magnet.

21. In mechanism adapted to wind a strip coming from a strip mill, the combination of a block comprising inner rotatable expandible mechanism and an outer rotatable casing separate therefrom, guiding means for the strip, a direct current magnet controlling the operation of said guiding means, a direct current generator supplying current for said magnet, a motor for driving the block and generator, an alternating current motor for driving the strip mill, and an electrical device in the circuit of said motor for controlling the last named direct current magnet.

22. In mechanism adapted to wind a strip coming from a strip mill, the combination of a block comprising inner rotatable expandible and magnetizable mechanism, an outer casing for the block separate therefrom, means to hold the outer casing stationary while the inner mechanism is rotating, guiding means for the strip, means to withdraw the guiding means from guiding position, means to hold the guiding means in guiding position, direct current magnets for controlling the expanding and magnetizing of the mechanism within the block, the releasing of the holding means for the outer casing of the block and the releasing of the guide withdrawing mechanism, a generator furnishing power for said magnets, a direct current magnet for controlling the flow of current from said generator to said magnets, said magnet also receiving its power from said generator, an alternating current motor for driving both the block and generator, an alternating current motor for driving the strip mill, and an electrical device dependent for its operation upon the amount of current flowing through said motor for controlling said last named direct current magnet.

23. In mechanism adapted to block strips coming from a strip mill, the combination of a rotatable block, pivoted members within the block, electromagnetic means for rotating said members about their pivots, windings for each of said members, an outer shell for said block, a generator for supplying current to said windings, a motor for driving the block and generator, and an electromagnetic device for controlling said first named electromagnetic means and the energization of the windings within the block, to cause the strip to be attached to the block by the expanding of the pivoted members within the block due to the movement of these members about their pivots and by the outer shell being drawn toward the inner mechanism of the block due to the energization of the said windings.

24. In mechanism adapted to block strips coming from a strip mill, the combination of a rotatable block, comprising inner expandible and magnetizable members and an outer shell, electromagnetic means for holding said shell stationary relative to the inner members of the block, a direct current generator supplying current to said electromagnetic means, a motor for rotating the block and the generator, a motor for driving the strip mill, an electromagnet controlled thereby having a movable core, contacts carried by said core, a pair of contacts adapted to be engaged by said first named contacts when the magnet is energized, a relay controlled by said contacts, the energization of said relay closing a circuit to cause the generator to energize the inside of the block and release the electromagnetic means for holding the shell of the block stationary.

25. In mechanism adapted to block strips coming from a strip mill, the combination of a rotatable block, comprising inner mechanism and an outer shell separate therefrom, guiding means for the strip, means for withdrawing the guiding means from operative position, means for holding the outer shell stationary and preventing the withdrawal of the guiding means, a motor for driving the block, a generator driven by said motor for supplying current to the means for holding the outer shell of the block stationary, a relay having a movable core, a contact carried by said movable core, a pair of stationary contacts adapted to be bridged by said contact, to close a circuit from the generator to cause the outer shell to be released and the guiding mechanism withdrawn, a motor for driving the strip mill, and means governed by the load on said motor for controlling the operation of the relay.

26. In mechanism adapted to wind a strip coming from a strip mill, the combination of a rotatable block, comprising inner mechanism and an outer shell separate therefrom, direct current electromagnetic means for actuating the inner mechanism to clamp the strip between the said mechanism and the outer shell of the block, a direct current generator for supplying current to said direct current electromagnetic means, a direct current relay having a movable core, contact mechanism carried thereby for controlling the flow of current from said generator to said first named direct current electromagnetic means, said relay also receiving its current from said generator, an alternating current motor for driving the strip mill, and an electromagnetic device in series with the circuit of said motor for controlling said relay.

27. In mechanism adapted to wind a strip coming from a strip mill, the combination of a rotatable block, two electromagnets arranged in parallel for controlling the operation of the block, a generator for supplying current to said electromagnets, a relay controlling the flow of current to said electromagnets from the generator, a circuit from said generator to said relay, a motor for driving the strip mill, and means controlled by the load on the motor for closing the circuit from the generator to said relay.

28. In mechanism adapted to block a strip coming from a strip mill, the combination of a rotatable block, windings within the block, a direct current generator for supplying current to said windings, an alternating current motor for driving the block and generator, and an automatically operated relay for automatically controlling the energization of said windings.

29. In mechanism adapted to block a strip coming from a strip mill, the combination of a motor for driving the strip mill, a rotatable block, windings within the block, a direct current generator for supplying current to said windings, an alternating current motor for driving the block and generator, a relay for automatically controlling the energization of said windings, and means operating automatically and dependent upon the load on the motor driving the strip mill for controlling said relay.

30. In mechanism adapted to block a strip coming from a strip mill, the combination of a block, adapted to wind a strip coming from a strip mill, collapsible mechanism within the block, and an automatically controlled stationary electroresponsive means for controlling said collapsible mechanism, mechanically connected with the said mechanism.

31. In mechanism adapted to wind a strip coming from a strip mill, the combination of a block adapted to wind a strip, collapsible mechanism within the block, an automatically controlled stationary electroresponsive device for controlling said collapsible mechanism, means carrying said block, and anti-friction means connecting said collapsible mechanism and stationary electroresponsive device.

32. In mechanism adapted to block a strip coming from a strip mill, the combination of a rotatable block, comprising inner rotatable mechanism and an outer shell, a hollow shaft carrying said shell, electromagnetic means for operating said inner mechanism, a mechanical connection within the hollow shaft between said electromagnetic means and the inner mechanism of the block, means opposing the action of said electromagnetic means, direct current generator for furnishing power to said electromagnetic means, and an alternating current electromagnetic device controlling the said first named electromagnetic means.

33. In mechanism adapted to block a strip coming from a strip mill, the combination of a rotatable block comprising inner rotatable mechanism and an outer shell separate therefrom, a rod for holding said outer shell stationary, a lever for actuating said rod to release the outer shell, a direct current electromagnet for operating said lever, a direct current generator for supplying current to said electromagnet, and an alternating current electromagnet for controlling the direct current electromagnet.

34. In mechanism adapted to block a strip coming from a strip mill, the combination of a rotatable block comprising inner rotatable mechanism and an outer shell separate therefrom, a rod for holding said outer shell stationary, a lever for actuating said rod to release the outer shell, guiding means for the block, a spring for withdrawing the guiding mechanism, means carried by the guiding mechanism and engaged by the said lever for holding the spring under tension when the guiding mechanism is in operative position, a direct current electromagnet for controlling said lever, a direct current generator for supplying current to said electromagnet, and an alternating current electromagnet for controlling said direct current electromagnet.

35. In blocking mechanism adapted to wind a strip coming from a strip mill, the combination of magnetically operated means for attaching the strip to the block when the same enters the block, collapsible mechanism within the block, and means coöperating with the block to expand said mechanism to clamp the strip at the instant the strip is attached to the block by said magnetically operated means.

36. In blocking mechanism adapted to wind a strip coming from a strip mill, the combination of magnetically operated means for attaching the strip to the block when the same enters the block, collapsible mechanism within the block, means coöperating with the block to expand the said mechanism to clamp the strip at the instant the strip is attached to the block by said magnetically operated means, and a single device controlling both of said means.

37. In blocking mechanism adapted to wind a strip coming from a strip mill, the combination of magnetically operative means for attaching the strip to the block when the same enters the block, means coöperating therewith to expand said strip-attaching means at the instant the strip is attached to the block, a generator for supplying current to both of said means, and a motor for driving both the block and generator.

38. In blocking mechanism adapted to wind a strip coming from a strip mill, the combination of magnetically operative means for attaching the strip to the block when the same enters the block, means coöperating therewith to expand said strip-attaching means at the instant the strip is attached to the block, a generator for supplying current to both of said means, a motor for driving both the block and generator, and an electroresponsive device for controlling the flow of current to both of said means.

39. In blocking mechanism adapted to wind a strip coming from a strip mill, the combination of magnetically operative means for attaching the strip to the block when the same enters the block, means coöperating therewith to expand said strip attaching means at the instant the strip is attached to the block, a generator for supplying current to both of said means, a motor for driving both the block and generator, an electroresponsive device for controlling the flow of current to both of said means, and an electric motor for driving the strip mill and controlling the said electroresponsive device.

40. In blocking mechanism adapted to wind a strip coming from a strip mill, the combination of magnetically operative means for attaching the strip to the block when the same enters the block, means coöperating therewith to expand the strip attaching means at the instant the strip is attached to the block, an electric motor for driving the strip mill and for controlling both of said means.

41. In blocking mechanism adapted to wind a strip coming from a strip mill, the combination of magnetically operative means for attaching the strip to the block when the same enters the block, means coöperating therewith to expand the strip attaching means at the instant the strip is attached to the block, and an electric motor for driving the strip mill and operative when the end of the strip is fed to the strip mill to cause the said means to be set into operation.

42. In blocking mechanism adapted to wind a strip coming from a strip mill, the combination of magnetic means for attaching a strip to the block, expanding mechanism within the block, for attaching the strip to the block and a second magnetic means for controlling the expanding mechanism.

43. In blocking mechanism adapted to wind a strip coming from a strip mill, the combination of magnetic means for attaching a strip to the block, collapsible mechanism within the block, and a second magnetic means for controlling the collapsible mechanism.

44. In blocking mechanism adapted to wind a strip coming from a strip mill, the combination of magnetic means for attaching a strip to the block, expanding mechanism within the block, magnetic means for controlling the expanding mechanism, and automatic means for controlling both of said magnetic means.

45. In blocking mechanism adapted to wind a strip coming from a strip mill, the combination of magnetic means for attaching a strip to the block, expanding and collapsing mechanism within the block, magnetic means for controlling the expanding and collapsing mechanism, and automatic means for controlling both of said magnetic means.

In testimony whereof, I have signed my name to this specification in the presence of two subscribing witnesses.

AUGUST SUNDH.

Witnesses:
  HAROLD RONNE,
  ERNEST L. GALE, Jr.